J. HANLON.
Assignor, by mesne assignments, to NATIONAL PETROLEUM GAS CO.
Gas Apparatus.
No. 8,402. Reissued Sept. 3, 1878.
Fig. I.
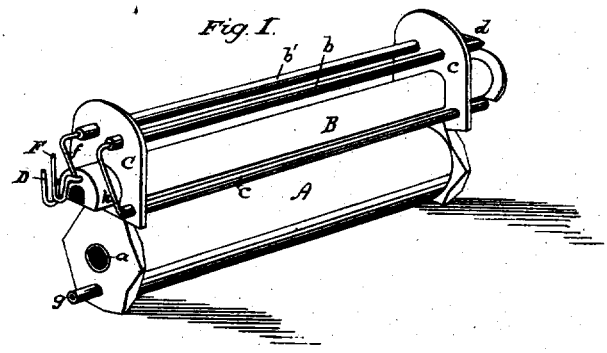
Fig. 2.
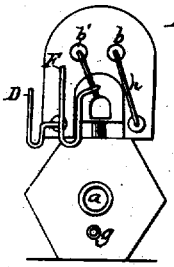
Fig. 3.
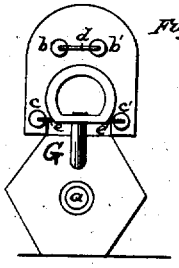
Fig. 4.
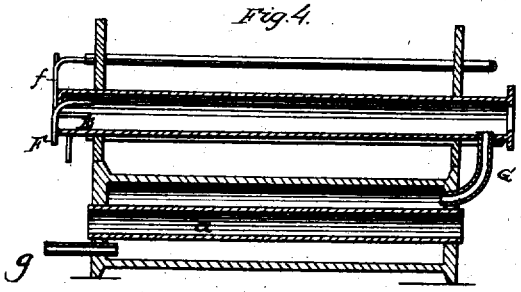
Fig. 5.
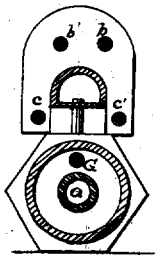
WITNESSES
C. Clarence Poole
W. H. Morsell
INVENTOR
John Hanlon
Per
A. S. Evans & Co ATTORNEYS
N. PETERS, PHOTO-LITHOGRAPHER, WASHINGTON, D. C.

UNITED STATES PATENT OFFICE.

JOHN HANLON, OF NEW YORK, N. Y., ASSIGNOR, BY MESNE ASSIGNMENTS, TO NATIONAL PETROLEUM GAS COMPANY.

IMPROVEMENT IN GAS APPARATUS.

Specification forming part of Letters Patent No. 157,818, dated December 15, 1874; Reissue No. 8,402, dated September 3, 1878; application filed June 21, 1878.

*To all whom it may concern:*

Be it known that I, JOHN HANLON, of the city, county, and State of New York, have invented a new and useful Improvement in Apparatus for the Manufacture of Illuminating-Gas from Liquid Hydrocarbons; and I do hereby declare that the following is a full, clear, and exact description thereof, reference being had to the accompanying drawings, making a part of this specification, in which—

Figure 1 is a perspective view of my apparatus. Fig. 2 is a front view. Fig. 3 is a rear view. Fig. 4 is a longitudinal section. Fig. 5 is a cross-section.

My invention consists in the combination of the several parts of my apparatus, as hereinafter described and claimed.

To enable others skilled in the art to make and use my invention, I will proceed to describe the exact manner in which I have carried it out.

In the drawings, A is a cylindrical retort, to be secured in a suitable furnace, constructed of brick-work or other masonry. This retort is constructed with a large open heat-flue, *a*, through its center longitudinally, which construction secures an annular generating-chamber between the flue *a* and the outer shell of the superheater. Thus I succeed in subjecting the gas to a double heating-surface, or two heating-surfaces at the same time. Above the retort A, I secure the retort B, also inclosed in the masonry, and exposed to the heat of the furnace. Around each end of the retort B are secured the front and rear face-plates, C C, which furnish bearings for the water-pipes *b b′ c c′*, as shown in Fig. 1. The pipes *b b′* are connected to the front of the retort by pipe *f*, and to each other, in the rear of the retort, by the pipe *d*, and are connected to the pipe *c* at the front by the pipe *h*; and the pipes *c c′* in the rear are connected by the pipe *e*, securing a continuous connected pipe from the point of the entrance of the water into the pipe at D to its subsequent discharge into the retort at E.

The purpose of these several pipes and their connections around the retort is the conversion of the water into steam before it enters the retort at E.

The pipe F furnishes the passage for the hydrocarbon liquid, and it enters the retort immediately above the steam-pipe *f* and extends a little beyond it, as shown in Fig. 4.

The operation of my apparatus is as follows: The water, being admitted at D, passes through the several pipes described and their connections, all subjected to the intense heat of the furnace, and during its passage through these pipes is converted into steam before it reaches the small pipe *f*, through which the steam passes into the retort at E. The pipe F, which conducts the liquid hydrocarbon into the retort, extends a little beyond the end of the pipe *f*. It is evident that the jet of steam, as it issues from the pipe *f*, will strike the falling hydrocarbon and carry it rearward through the retort and into the pipe G, by which it is conducted into the lower retort, through which it is again passed between heating-surfaces, as previously described, to the exit *g*, from which the gas passes to any receptacle prepared for the purpose.

From the foregoing explanation of the construction and operation of my apparatus it will be clear to those familiar with gas apparatus that, by my arrangement of the steam-jet to strike, disperse, and carry rearward the heavy hydrocarbon as it enters the retort, I effectually prevent the carbonizing of the retort, which would otherwise take place, and which is so very objectionable in oil-gas generators as now constructed.

I am aware that jets of steam have been arranged so as to impinge upon the hydrocarbon at a point outside of the body of the retort; and therefore I do not claim this as my invention.

Having thus described my invention, what I claim as new, and desire to secure by Letters Patent, is—

1. In an illuminating-gas apparatus, the retort B and steam-pipe *f*, entering within the retort immediately below the oil-pipe F, in combination with the oil-pipe F, also entering within the retort at a point immediately above the steam-pipe, whereby a jet of steam is caused to impinge upon the falling hydrocarbon within the body of the retort, substantially as and for the purpose herein described.

2. The cylindrical retort A, provided with the central heat-flue *a*, in combination with the retort B and pipes *b b'*, *c c'*, *d*, *h*, and *e*, and the pipes F and *f*, constructed, arranged, and operated substantially as and for the purpose specified.

JOHN HANLON.

Witnesses:
DAVID J. POST,
L. F. POST.